United States Patent [19]

Tong et al.

[11] Patent Number: 4,977,111
[45] Date of Patent: Dec. 11, 1990

[54] POROUS RADIANT BURNERS HAVING INCREASED RADIANT OUTPUT

[75] Inventors: Timothy W. Tong; Sanjeev B. Sathe; Robert E. Peck, all of Tempe, Ariz.

[73] Assignee: Arizona Board of Regents, Tempe, Ariz.

[21] Appl. No.: 389,542

[22] Filed: Aug. 4, 1989

[51] Int. Cl.$^5$ ............................................... C04B 35/76
[52] U.S. Cl. ..................................... 501/95; 431/328; 431/329
[58] Field of Search .................. 501/95; 431/326, 328, 431/329; 428/34.5, 903, 903.3

[56] References Cited

U.S. PATENT DOCUMENTS

| | | | |
|---|---|---|---|
| 4,673,349 | 6/1987 | Abe | 431/328 |
| 4,746,287 | 5/1988 | Lannutti | 431/328 |
| 4,857,489 | 8/1989 | Bearden | 501/95 |
| 4,878,837 | 11/1989 | Otto | 431/328 |
| 4,889,481 | 12/1989 | Morris | 431/328 |
| 4,917,599 | 4/1990 | Hasselmann | 431/328 |

Primary Examiner—William R. Dixon, Jr.
Assistant Examiner—Chris Gallo
Attorney, Agent, or Firm—Richard R. Mybeck

[57] ABSTRACT

Means and methods for enhancing the output of radiant energy from a porous radiant burner by minimizing the scattering and increasing the adsorption, and thus emission of such energy by the use of randomly dispersed ceramic fibers of sub-micron diameter in the fabrication of ceramic fiber matrix burners and for use therein.

4 Claims, 2 Drawing Sheets

POROUS RADIANT BURNERS HAVING INCREASED RADIANT OUTPUT

INTRODUCTION

The present invention relates generally to porous radiant burners and more particularly to means and methods for enhancing the radiant output of such radiant burners.

BACKGROUND OF THE INVENTION

Porous radiant burners are known to the art which contain a fibrous matrix compound of ceramic or metal fibers of a few microns in diameter that acts as an emitter of radiant energy. To date, however, such burners have not gained wide acceptance for most industrial and commercial applications because the radiant output is not high enough to meet application requirements.

The history of the evolution of porous radiant burners consisting of ceramic fibers from the classic blue flame burners most people associate with gas combustion is well described in the Gas Research Institute Digest, Volume 7, Number 4 (July/August 1984) at pages 4–9 and while some of the optimism reported therein has not materialized to date, for reasons which hereinafter shall become apparent, the general premise stated therein is valid and is incorporated herein by this reference thereto.

BRIEF SUMMARY OF THE INVENTION

This disclosure relates generally to porous radiant burners and particularly to novel and unique means and methods for substantially increasing the radiant output of such porous radiant burners. Specifically, particularly, the present invention relates to an improved ceramic fiber matrix and methods of making same for use in porous radiant burners to obtain substantially improved radiant efficiency therefrom.

The present invention is essentially predicated upon the unexpected but remarkable discovery that the radiant output of typical porous radiant burners which have ceramic fiber matrix burners formed of circular ceramic fibers of a few microns or larger in diameter, such as the PYROCORE burners available from the Alzeta Corporation, Mountain View, Calif., can be dramatically enhanced by the use of randomly dispersed sub-micron size fibers of reduced single scattering albedo in unique methology to create ceramic fiber matrixes that minimize scattering of radiant energy relative to absorption of radiant energy.

Accordingly, a prime object of the present invention is to provide new and unique means and methods for substantially increasing the radiant output of a radiant burner thereby converting a scientific curiosity into a highly useful commercial tool.

These and still further objects, as shall hereinafter appear, are fulfilled by the present invention in a remarkably unexpected fashion as will be readily discerned from the following detailed description of useful embodiments thereof, especially when read in conjunction with the accompanying drawing.

DESCRIPTION OF PREFERRED EMBODIMENTS

The present invention relates to novel means and methods for increasing the radiant output of porous radiant burners and more particularly to the insightful selection of components for and creating special porous radiant burners consisting of a matrix of randomly dispersed ceramic fibers of sub-micron diameter.

Figure 1:
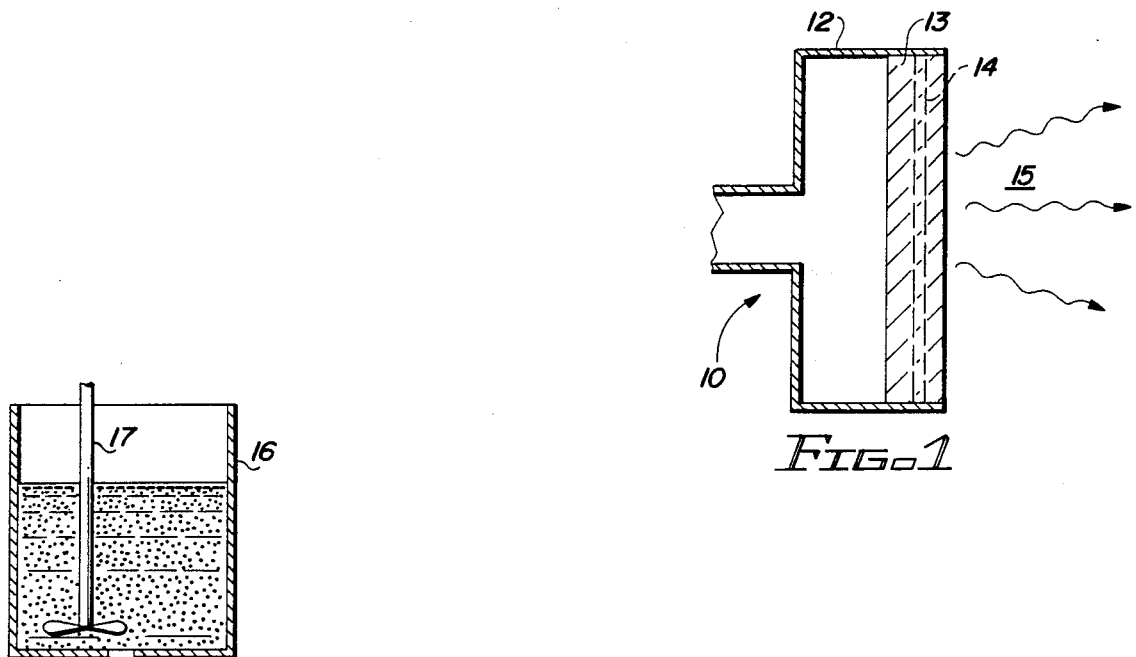
FIG. 1 is a schematic diagram of a porous radiant burner.

In practice, porous radiant burners, as shown in FIG. 1, are operated by introducing a premixed gaseous fuel-air mixture into a non-combustible porous matrix. By adjusting the gas flow rate, combustion can be stabilized inside the porous matrix and the heat from the burning gas warms the porous matrix via convection. The porous matrix, in turn, radiates thermal energy away from the porous matrix. This thermal radiation, in turn, supplies heat to a desired heat load.

A unique porous radiant burner embodying the present invention is created on an appropriate support by vacuum molding in the manner which will now be described.

A slurry of water and sub-micron ceramic fibers such as silica, alumina and the like is prepared by stirring or otherwise admixing the water and fiber for about thirty minutes. The fiber-to-water weight ratio (w/w) of the fiber-water slurry is from about 0.3 to about 5.0 percent. One suitable fiber for use herein is available from John Mansville, Denver, Colo. under the tradename MIN-K insulation.

Next, a sufficient amount of a suitable binder, such as alumina cement, zirconia cement or zirconia rigidizer (all available from Zircon Fibrous Ceramics, Florida, N.Y.) is added to the water-fiber slurry with stirring to provide a binder-to-fiber weight ratio of about 0.2 to about 0.8, depending upon the mechanical strength desired in the final porous matrix. The higher the binder-to-fiber weight ratio, the higher the mechanical strength will be. The slurry, with binder added, is stirred for another thirty minutes.

After mixing of the binder into the slurry is completed, an appropriate amount of the slurry is allowed to flow onto a mandrel and into the molding tank. The amount of slurry flowed onto the mandrel is dependent upon the thickness of the porous matrix desired. Thereupon, the mandrel, having millimeter-size holes is disposed across the open mouth of the tank. The mold is formed as the fibers deposit on the mandrel and the water is drawn therethrough by vacuum. The mandrel can be planar or oval or circular or any other desired shape.

The mold formed by depositing wet sub-micron fibers on the mandrel is dried by blowing air thereover. This drying procedure can take from several minutes up to several hours, depending on the size of the mold to be dried.

After drying, the air-dried mold is then cured by heating the mold to a temperature of from between about 430° C. to about 550° C. for a period of from about 2 to about 4 hours.

After curing, the cured porous matrix thus formed is ready to be installed into the chamber of a porous radiant burner for purposes which shall hereinafter become apparent.

Depending upon the specific application desired, the foregoing procedures may be modified to meet special requirements either as to mechanical strength or as to porosity of the mold.

Figure 2:
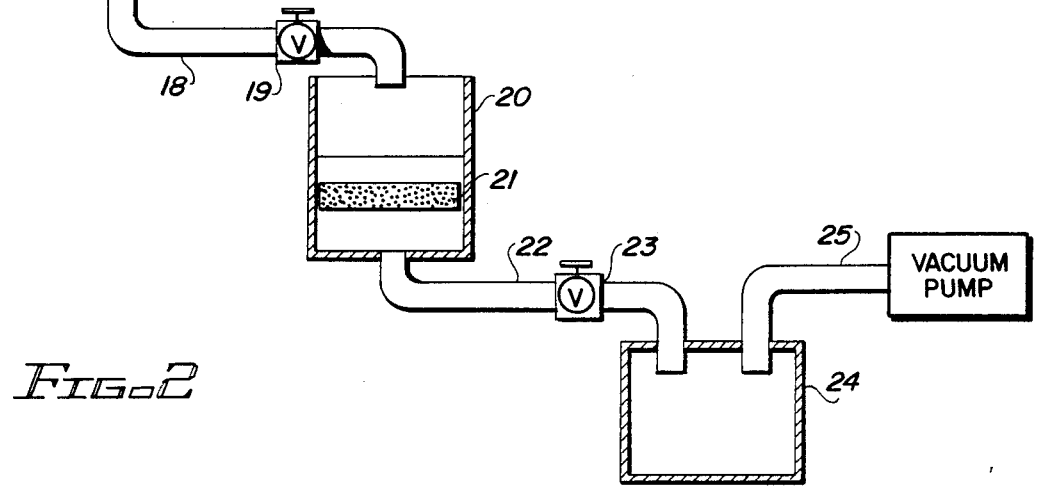
FIG. 2 is a schematic showing of a typical molding tank and mandrel for use with the present invention.

In an alternative embodiment where enhanced mechanical support of the porous matrix is required, a stainless-steel screen is placed on the mandrel before the fiber-water slurry is fed therethrough. In this embodiment, the fibers deposit on the screen directly and unite therewith to form the mold. Different burner shapes can be produced by using appropriately shaped molding tanks and mandrels. FIG. 2 shows a molding tank and mandrel. The mandrel can provide cylindrical, oval, or flat matrixes, as desired. Also, as indicated above, mechanical support of the porous matrix can be obtained by forming the matrix on a stainless-steel screen which is then disposed within the cured fiber mold.

The present invention, as will hereinafter appear, reflects a vast improvement in the performances of porous radiant burners in their use and is predicated upon the unexpected discovery that the creation of a matrix having smaller single scattering albedo will produce a higher radiant output (See: Tong and Sathe, Heat Transfer Characteristics of Porous Radiant Burners, ASME HTD, Vol. 104, pp. 147–155, 1988). It is our belief that fibers with smaller single scattering albedo ($\omega$) will provide a much higher emission of radiant energy when employed in porous radiant burners in accordance with the present invention. While the porous matrix of typical prior art porous radiant burners were made of circular ceramic fibers a few microns or larger in diameter, the present invention demonstrates that $\omega$ can be reduced significantly by the use of randomly dispersed sub-micron size ceramic fibers to form ceramic matrixes and that the use of burners containing such ceramic matrixes produces, in fact, a dramatically higher output of radiant thermal energy.

To assist in the better understanding of the present invention., and not by way of limitation, the rationale underlying our novel means and methods will now be discussed.

Since the radiation spectrum involved in heating applications ranges roughly from one to fifteen microns in wavelength, the size parameter ($\alpha = \pi D/\lambda$, where D is the fiber diameter and $\lambda$ is the wavelength of radiation) of the fibers is of the order of one or slighly larger. But, if one draws upon electromagnetic wave scattering theory (See: Kerker, The Scattering of Lights, Chapter 6, Academic Press, New York, 1969), it is known that when $\alpha << 1$ the scattering efficiency ($Q_s$) is small compared to the absorption efficiency ($Q_a$) and hence, $\omega$ is also small because $\omega = Q_s/(Q_s + Q_a)$. The foregoing suggests that the radiant output of porous radiant burners can be significantly increased by the use of fibers which are substantially smaller than those currently used.

Using a mathematical model which is capable of predicting radiant output as a function of fiber size, results were obtained that clearly confirmed the premise that significant increases in radiant output can be obtained when the fiber size was reduced to less than one micron.

In the development of the present invention, it was discovered that smaller single scattering albedo of the porous matrix creates higher radiant output. Heretofore, the porous matrix of a porous radiant burner ("PRB") was made of cylindrical fibers of several microns in diameter. Since the radiation spectrum involved in the application ranges roughly one to fifteen microns in wavelength, the size parameter ($\alpha = \pi D/\lambda$, where D is the fiber diameter and is the wavelength of radiation) of the fibers is of the order of one slightly larger. Thus, when $\alpha << 1$ the scattering efficiency ($Q_s$) is small compared to the absorption efficiency ($Q_a$) and hence, $\omega$ is also small because $\omega = Q_s/(Q_s + Q_a)$ (Kerker, 1969, supra). From this it was postulated that the radiant output of a PRB could be increased by using fibers which are substantially smaller than those currently used. The present invention establishes quantitatively how much the radiant output of a PRB is increased when sub-micron ceramic fibers are used.

In order to completely understand the present invention, a brief description of the operational principle of a PRB is in order. In application, a premixed gaseous fuel-air mixture is introduced into a non-combustible porous matrix and, by adjusting the mass flow rate, combustion is stabilized therewithin. The burned gas from the combustion heats up the porous matrix via convection which in turn radiates thermal energy away from the porous matrix. Heating is then provided to a heat load by means of this thermal radiation.

The following analysis is based on a heat transfer model which treats combustion as a constant heat source and uses the theory of electromagnetic wave scattering (Kerker, supra), to determine the radiative properties of the fibers. These properties as determined are then used as the input parameters in the heat transfer model to calculate the radiant output.

In determining the radiative properties of fibers, the fibers are assumed to be infinitely long cylinders. For unpolarized incident radiation with wavelength $\lambda$, the extinction efficiency $Q_e$, which is the sum of $Q_s$ and $Q_a$, and $Q_s$ of a fiber are given by Kerker, supra.

$$Q_e = \left[ \text{Real } b_{01} + 2 \sum_{n=1}^{\infty} b_{n1} + 2 \sum_{n=1}^{\infty} a_{n1} + 2 \sum_{n=1}^{\infty} b_{n2} + a_{02} + 2 \sum_{n=1}^{\infty} a_{n2} \right]/\alpha \quad (1)$$

$$Q_s = \left[ |b_{01}|^2 + 2 \sum_{n=1}^{\infty} |b_{n1}|^2 + 2 \sum_{n=1}^{\infty} |a_{n1}|^2 + 2 \sum_{n=1}^{\infty} |b_{n2}|^2 + |a_{02}|^2 + 2 \sum_{n=1}^{\infty} |a_{n2}|^2 \right]/\alpha \quad (2)$$

where $a_{n1}$, $b_{n1}$, $a_{n2}$ and $b_{n2}$ are coefficients that depend on the incidence angle $\Phi$, wavelength of radiation $\lambda$, fiber diameter D, and the complex refractive index of the fiber. The expressions for $a_{n1}$, $b_{n1}$, $a_{n2}$, and $b_{n2}$ can be found in Kerker supra. The efficiencies averaged over all wavelengths and incidence angles are determined according to:

$$z = \frac{2}{\pi \sigma T_m^4} \int_0^{\pi/2} \int_0^{\infty} z e_b(T_m) d\lambda d\Phi \quad (3)$$

wherein z represents either $Q_e$, or $Q_s$, and the overbar indicates averaged values. Note that Planck's function $e_b$ evaluated at some characteristic temperature $T_m$ has been used as the weighting function in the averaging process. Equations (1) through (3) can be used to compute the averaged efficiencies once D, the complex refractive index of the fiber, and $T_m$ are specified.

The heat transfer model to be employed requires the averaged scattering albedo and the averaged extinction coefficient as input properties. The averaged single albedo is $$\omega = \frac{\overline{Q_s}}{\overline{Q_e}} \tag{4}$$

while the averaged extinction coefficient is related to the averaged extinction efficiency by:

$$\overline{\sigma_e} = \frac{4\overline{Q_e}(1-\phi)}{\pi D} \tag{5}$$

with $\phi$ being the porosity.

Figure 3:
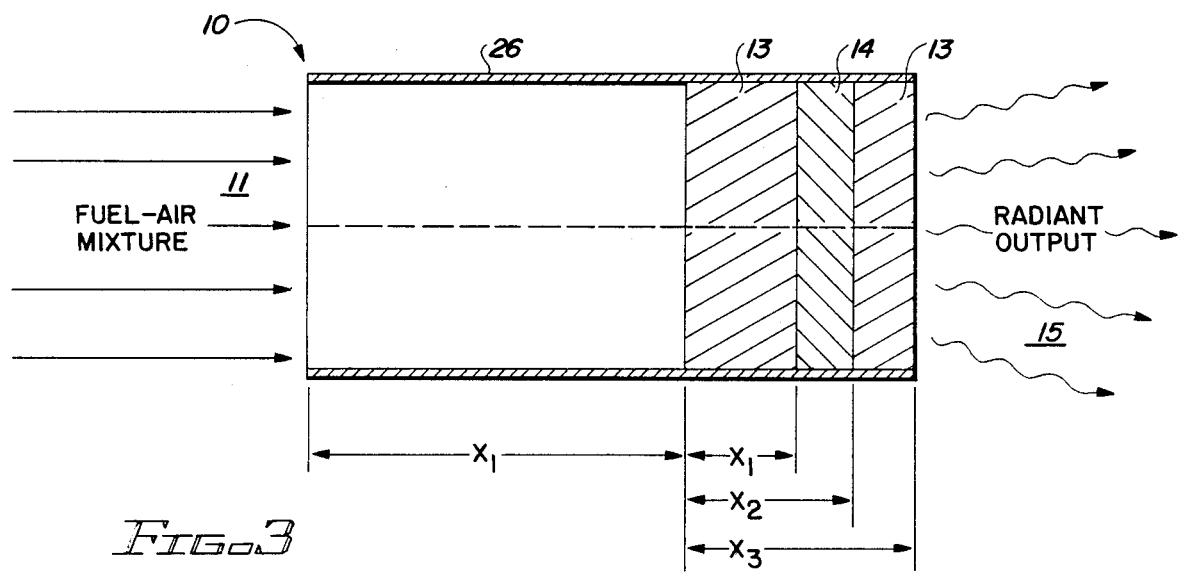
FIG. 3 is a schematic of the model for the porous radiant burner used herein.

Assuming constant thermophysical properties, steady and laminar slug flow, and one-dimensional radiative heat transfer, the governing equations for a geometry as shown in FIG. 3 can be written in dimensionless form as follows:

Energy Equation for the Gas Phase $$P_1 \frac{d\theta_g}{d\xi} + (1-\phi) P_2(\theta_g - \theta_s) = \phi\delta(\xi) + P_3 \frac{d^2\theta_g}{d\xi^2} \tag{6}$$

Energy Equation for the Solid Phase $$(1-\phi) P_4 \frac{d^2\theta_s}{d\xi^2} + (1-\phi) P_2(\theta_g - \theta_s) = \frac{dQ^r}{d\xi} \tag{7}$$

Equation of Radiative Transfer $$\frac{\mu}{\tau} \frac{\partial I(\xi,\mu)}{\partial \xi} + I(\xi,\mu) = (1-\omega) I_b(\theta_s) + \frac{\omega}{2} \int_{-1}^{1} I(\xi,\mu')d\mu' \tag{8}$$

Net Radiative Heat Flux $$Q^r = 2\pi \int_{-1}^{1} I(\xi,\mu')\mu'd\mu' \tag{9}$$

Boundary Conditions for the Gas Phase Energy Equation $$\theta_g = 0 \text{ at } \xi = -\xi_i \tag{10a}$$

$$\frac{d\theta_g}{d\xi} = 0 \text{ at } \xi = \xi_3 \tag{10b}$$

Boundary Conditions for the Solid Phase Energy Equation $$-\frac{d\theta_s}{d\xi} = P_5(\theta_g - \theta_s) \text{ at } \xi = 0 \tag{11a}$$

$$\frac{d\theta_s}{d\xi} = P_5(\theta_g - \theta_s) \text{ at } \xi = \xi_3 \tag{11b}$$

Boundary Conditions for the Equation of Radiative Transfer $$I^+(0) = 2 \int_0^1 I^-(0, -\mu')\mu'd\mu' \tag{12a}$$

$$I^-(\xi_3) = \frac{G_e(T_e)}{\pi} \tag{12b}$$

where the dimensionless variables are defined as:

$\xi = x/x_3$, $\quad \theta_g = (T_g - T_i)/T_i$, $\theta_s = (T_s - T_i)/T_i$, $\quad I = i/Qx_3$, $I_b = i_b/Qx_3$, $\quad \tau = \sigma_e x_3$, $Q^r = q^r/Qx_3$, $\quad G_e = \sigma T_e^4/Qx_3$ The definitions of the dimensional variables can be found in the table of Nomenclature, shown below. The physical significance and the dimensions of the parameters $P_1$ through $P_5$ are given in Table 1, below. Heat generation due to combustion is represented by the term $\phi\delta(\xi)$ in equation (6), where $\delta(\xi)$ is a delta function defined as unity for $\xi_1 \leq \xi \leq \xi_2$ and zero elsewhere.

| NOMENCLATURE | |
|---|---|
| a | Solid surface area unit volume of solid |
| $a_{n,1}$ | Coefficients (TM mode) |
| $a_{n,2}$ | Coefficients (TE mode) |
| $b_{n,1}$ | Coefficients (TM mode) |
| $b_{n,2}$ | Coefficients (TE mode) |
| c | Specific heat |
| D | Fiber diameter |
| $e_b$ | Planck's function |
| G | Non-dimensional emissive power, $\nu T^4/Qx_3$ |
| h | Heat transfer coefficient |
| i | Radiant intensity |
| I | Non-dimensional radiant intensity, $i/Qx_3$ |
| k | Thermal conductivity |
| $P_1$–$P_5$ | Non-dimensional parameters as defined in Table 1 |
| $q^r$ | Radiative heat flux |
| Q | Heat generation rate per unit volume |
| $Q_o^r$ | Non-dimensional radiative heat flux, $q^r/Qx_3$ |
| $Q^r$ | Non-dimensional radiant output, $Q^r(\xi_3)$ |
| $Q_e$ | Extinction efficiency |
| $Q_s$ | Scattering efficiency |
| $\overline{Q_e}$ | Averaged extinction efficiency |
| $\overline{Q_s}$ | Averaged scattering efficiency |
| T | Temperature |
| $T_m$ | Characteristic temperature |
| u | Velocity |
| x | Coordinate |
| $x_1$–$x_3$ | Lengths defined in FIG. 1 |
| z | Dummy variable in equation (3) |
| $\overline{z}$ | Averaged z |
| Greek Symbols | |
| $\alpha$ | Size parameter |
| $\delta$ | Unit step function |
| $\theta$ | Non-dimensional temperature, $(T-T_1)/T_i$ |
| $\lambda$ | Wavelength of radiation |
| $\mu,\mu'$ | Direction cosine |
| $\xi$ | Non-dimensional coordinate, $x/x_3$ |
| $\rho$ | Density |
| $\nu$ | Stefan-Boltzmann constant |
| $\nu_a$ | Absorption coefficient |
| $\nu_e$ | Extinction coefficient |
| $\overline{\nu_e}$ | Averaged extinction coefficient |
| $\nu_s$ | Scattering coefficient |
| $\tau$ | Optical thickness, $(\nu_a + \nu_s)x_3$ |
| $\phi$ | Porosity |
| $\Phi$ | Incidence angle |
| $\underline{\omega}$ | Single scattering albedo, $\nu_s/(\nu_a + \nu_s)$ |
| $\omega$ | Averaged single scattering albedo |
| Superscripts | |
| r | Radiation |
| + | Positive x direction |

| | -continued |
|---|---|
| − | Negative x direction |
| | Subscripts |
| b | Blackbody or baseline calculation |
| e | Exit |
| g | Gas |
| i | Inlet |
| o | Output |
| s | Solid |

Equation (6) will be applied to the entire domain that is $-\xi_i \leq \xi \leq \xi_3$. According, $\phi$ is defined such that $\phi=1$ for $\xi<0$ and $0 \leq \phi \leq 1$ for $0 \leq \xi \leq \xi_3$.

TABLE 1

Significance of $P_1$ through $P_5$.

| Parameter | Physical Significance |
|---|---|
| $P_1 = \rho u c_g T_i / Q x_3$ | flow enthalpy |
| $P_2 = h a T_i / Q$ | convective energy coupling between gas and solid |
| $P_3 = k_g T_i / Q x_3 2$ | gas conduction |
| $P_4 = k_s T_i / Q x_3 2$ | solid conduction |
| $P_5 = h x_3 / k_s$ | Biot number |

Equations (7) and (8) are coupled through equation (9) and they will be used for the porous region. As far as the boundary conditions are concerned, equation (10b) specifies that it is adiabatic for the gas at the exit plane. This results from assuming local one way behavior at the outflow position has been shown to be a reasonable approximation for flow situations such as that being considered (Patankar, S. V., *Numerical Heat Transfer and Fluid Flow*, McGraw Hill, New York, 1980). Equations (11a) and (11b) equate the convective heat flux between the gas and solid phases to the conductive heat flux. The upstream radiative boundary condition as indicated by equation (12a) is formulated by characterizing the upstream as a gray and a perfectly reflecting surface. Equation (12b) assumes that the burner sees a black environment at $T_e$.

Both silica and alumina fibers were considered at $T_m = 1000°$ C. and $T_m = 1500°$ C. for use as the porous material for the burner. Computations for $\overline{Q}_s$, $\overline{Q}_e$ and $\omega$ were done by using the trapezoidal rule to approximate the integrals in equation (3). The integration with respect to $\Phi$ were done at 1 degree intervals. The integration with respect to $\lambda$ were performed at 0.05 µm intervals with 1 and 6.15 µm chosen as the lower and upper integration limits, respectively. This wavelength range contains 98 and 96 percent of the blackbody radiant energy when 1000° C. and 1500° C., respectively, were employed as $T_m$. Such a range of characteristic temperatures is representative of the flame temperatures in PRB. For silica fibers the complex refractive index from Malitson (1965) for $\lambda<7$ µm and from Champtier and Friese (1974) for $\lambda \geq 7$ µm were used. The latter reference also provided the complex refractive index for alumina for all wavelengths.

Equation (8) was then transformed to a set of four first-order ordinary differential equations in terms of the moments of the radiant intensity using the P-3 spherical harmonics approximation. Equations (12a) and (12b) were replaced by the Marshak's boundary conditions which required the intensity moments to be conserved. The spherical harmonics method and the Marshak's boundary conditions for solving the equation of radiative transfer have been well documented by Davison, *Neutron Transport Theory*, Oxford University Press, 1957 which reference for the mathematical details contained therein is incorporated herein by this reference thereto. As shown by equation (9), the first moment of the radiant intensity is the net radiative heat flux.

The four equations governing the moments of the radiant intensity and equations (6) and (7) were solved according to the following procedure:
1. Guess $d\theta_g/d\xi$ at $\xi=0$;
2. Solve equation (6) analytically for the region $-\xi_i \leq \xi \leq 0$ using equation (10 a) and the boundary condition from step 1;
3. Determine at $\theta_g$ at $\xi=0$ using the solution from step 2;
4. Numerically solve equations (6) and (7) and the four equations resulting from the P-3 spherical harmonics approximation for the region $0 \leq \xi \leq \xi_3$ using equations (10b), (11a) and (11b), the boundary condition from step 3 and the Marshak's boundary conditions;
5. Determine $d\theta_g/d\xi$ at $\xi=0$ using the solution from step 4; and
6. Repeat steps 2 to 5 until convergence is achieved.

The subroutine DVCPR from the IMSL library was used to perform the computation in step 4. Convergence for step 6 was assumed when all the following conditions were met:

Fractional change in $d\theta_g/d\xi$ at $\xi=0$ in consecutive iterations was less than $10^{-4}$;

2. Fractional change in $\theta_g$ at $\xi=b\ 0$ in consecutive iterations was less than $10^{-4}$; and 3. An overall energy balance of less than 0.1 percent was achieved.

A relative error tolerance of $10^{-4}$ was specified for the iterations internal to subroutine DVCPR.

The averaged efficiencies and single scattering albedo for silica and alumina fibers are shown below in Tables 2 and 3, respectively. The properties were evaluated at characteristic temperatures of 1000° C. and 1500° C. The results cover fiber diameters ranging from 0.001 to 5 µm. For both fibers, $\overline{Q}_e$ and $\overline{Q}_s$ first increase and then decrease as the fiber diameter is reduced from 5 µm. This is typical of the oscillatory behavior of the efficiencies when $\alpha$ is of order one or slightly larger (Kerker, supra). For the approximations used in carrying out the wavelength integral in equation (3) (i.e. 1 and 16.5 µm for the lower and upper limits respectively), $\alpha$ ranges from 15.75 to 0.95 for a diameter of 5 µm. Even for a smaller diameter such as 1 µm, $\alpha$ is about order one in most of the spectrum since it ranges from 3.14 to 0.19. Therefore, it is clear that for diameters 1 µm or larger, the efficiencies can be regarded as in the regime where there is oscillatory behavior. When the diameter is less than 1 µm, there is clearly a monotonic decreasing trend for the averaged efficiencies as the diameter is reduced.

TABLE 2

Averaged efficiencies and single scattering albedo of silica fibers: (a) $T_m = 1000°$ C.; (b) $T_m = 1500°$ C.

| D (µm) | $Q_e$ | $Q_s$ | $\omega$ |
|---|---|---|---|
| | (a) | | |
| 5 | 1.6091 | 1.5534 | 0.96540 |
| 4 | 1.6783 | 1.6261 | 0.96888 |
| 3 | 1.6990 | 1.6515 | 0.97204 |
| 2 | 1.4998 | 1.4564 | 0.97107 |
| 1 | $7.5246 \times 10^{-1}$ | $7.2113 \times 10^{-1}$ | 0.95836 |
| 0.5 | $2.3161 \times 10^{-1}$ | $2.1223 \times 10^{-1}$ | 0.91623 |
| 0.4 | $1.3520 \times 10^{-1}$ | $1.1916 \times 10^{-1}$ | 0.88139 |
| 0.3 | $6.0921 \times 10^{-2}$ | $4.8575 \times 10^{-2}$ | 0.79735 |

TABLE 2-continued

Averaged efficiencies and single scattering albedo of silica fibers: (a) $T_m = 1000°$ C.; (b) $T_m = 1500°$ C.

| D (μm) | $\overline{Q}_e$ | $\overline{Q}_s$ | $\omega$ |
|---|---|---|---|
| 0.2 | $2.1270 \times 10^{-2}$ | $1.2887 \times 10^{-2}$ | 0.60591 |
| 0.1 | $5.6608 \times 10^{-3}$ | $1.4254 \times 10^{-3}$ | 0.25180 |
| 0.09 | $4.8435 \times 10^{-3}$ | $1.0292 \times 10^{-3}$ | 0.21250 |
| 0.08 | $4.1088 \times 10^{-3}$ | $7.1641 \times 10^{-4}$ | 0.17436 |
| 0.07 | $3.4458 \times 10^{-3}$ | $4.7594 \times 10^{-4}$ | 0.13812 |
| 0.06 | $2.8441 \times 10^{-3}$ | $2.9741 \times 10^{-4}$ | 0.10457 |
| 0.05 | $2.2939 \times 10^{-3}$ | $1.7091 \times 10^{-4}$ | 0.07451 |
| 0.04 | $1.7858 \times 10^{-3}$ | $8.6969 \times 10^{-5}$ | 0.04870 |
| 0.03 | $1.3109 \times 10^{-3}$ | $3.6498 \times 10^{-5}$ | 0.02784 |
| 0.02 | $8.6050 \times 10^{-4}$ | $1.0769 \times 10^{-5}$ | 0.01252 |
| 0.01 | $4.2624 \times 10^{-4}$ | $1.3422 \times 10^{-6}$ | 0.00315 |
| 0.005 | $2.1262 \times 10^{-4}$ | $1.6764 \times 10^{-7}$ | 0.00079 |
| (b) | | | |
| 5 | 1.5715 | 1.5456 | 0.98352 |
| 4 | 1.6121 | 1.5879 | 0.98499 |
| 3 | 1.7392 | 1.7173 | 0.98473 |
| 2 | 1.7445 | 1.7246 | 0.98845 |
| 1 | 1.1547 | 1.1402 | 0.98750 |
| 0.5 | $4.4964 \times 10^{-1}$ | $4.4073 \times 10^{-1}$ | 0.98017 |
| 0.4 | $2.9451 \times 10^{-1}$ | $2.8713 \times 10^{-1}$ | 0.97495 |
| 0.3 | $1.5339 \times 10^{-1}$ | $1.4771 \times 10^{-1}$ | 0.96297 |
| 0.2 | $4.6254 \times 10^{-2}$ | $4.2397 \times 10^{-2}$ | 0.91663 |
| 0.1 | $6.3525 \times 10^{-3}$ | $4.4038 \times 10^{-3}$ | 0.69324 |
| 0.09 | $4.9123 \times 10^{-3}$ | $3.1573 \times 10^{-3}$ | 0.64274 |
| 0.08 | $3.7440 \times 10^{-3}$ | $2.1832 \times 10^{-3}$ | 0.58311 |
| 0.07 | $2.8079 \times 10^{-3}$ | $1.4414 \times 10^{-3}$ | 0.51336 |
| 0.06 | $2.0673 \times 10^{-3}$ | $8.9560 \times 10^{-4}$ | 0.43322 |
| 0.05 | $1.4888 \times 10^{-3}$ | $5.1198 \times 10^{-4}$ | 0.34389 |
| 0.04 | $1.0409 \times 10^{-3}$ | $2.5929 \times 10^{-4}$ | 0.24909 |
| 0.03 | $6.9473 \times 10^{-4}$ | $1.0837 \times 10^{-4}$ | 0.15598 |
| 0.02 | $4.2284 \times 10^{-4}$ | $3.1867 \times 10^{-5}$ | 0.07536 |
| 0.01 | $1.9946 \times 10^{-4}$ | $3.9622 \times 10^{-6}$ | 0.01986 |
| 0.005 | $9.8248 \times 10^{-5}$ | $4.9449 \times 10^{-7}$ | 0.00503 |

TABLE 3

Averaged efficiencies and single scattering albodo of alumina fibers: (a) $T_m = 1000°$ C.; (b) $T_m = 1500°$ C.

| D (μm) | $\overline{Q}_e$ | $\overline{Q}_s$ | $\omega$ |
|---|---|---|---|
| (a) | | | |
| 5 | 1.5204 | 1.5123 | 0.99467 |
| 4 | 1.5601 | 1.5529 | 0.99537 |
| 3 | 1.6663 | 1.6598 | 0.99610 |
| 2 | 1.7765 | 1.7697 | 0.99616 |
| 1 | 1.3743 | 1.3690 | 0.99615 |
| 0.5 | $5.3004 \times 10^{-1}$ | $5.2050 \times 10^{-1}$ | 0.98191 |
| 0.4 | $3.3431 \times 10^{-1}$ | $3.2511 \times 10^{-1}$ | 0.97247 |
| 0.3 | $1.5532 \times 10^{-1}$ | $1.4909 \times 10^{-1}$ | 0.95987 |
| 0.2 | $4.3107 \times 10^{-2}$ | $3.9940 \times 10^{-2}$ | 0.92654 |
| 0.1 | $5.4371 \times 10^{-3}$ | $4.1072 \times 10^{-3}$ | 0.75539 |
| 0.09 | $4.1262 \times 10^{-3}$ | $2.9429 \times 10^{-3}$ | 0.71321 |
| 0.08 | $3.0743 \times 10^{-3}$ | $2.0333 \times 10^{-3}$ | 0.66139 |
| 0.07 | $2.2438 \times 10^{-3}$ | $1.3414 \times 10^{-3}$ | 0.57983 |
| 0.06 | $1.5999 \times 10^{-3}$ | $8.3281 \times 10^{-4}$ | 0.52054 |
| 0.05 | $1.1104 \times 10^{-3}$ | $4.7597 \times 10^{-4}$ | 0.42848 |
| 0.04 | $7.4545 \times 10^{-4}$ | $2.4085 \times 10^{-4}$ | 0.32309 |
| 0.03 | $4.7720 \times 10^{-4}$ | $1.0063 \times 10^{-4}$ | 0.21088 |
| 0.02 | $2.7969 \times 10^{-4}$ | $2.9589 \times 10^{-5}$ | 0.10579 |
| 0.01 | $1.2842 \times 10^{-4}$ | $3.6790 \times 10^{-6}$ | 0.02865 |
| 0.005 | $6.2786 \times 10^{-5}$ | $4.5914 \times 10^{-7}$ | 0.00731 |
| (b) | | | |
| 5 | 1.4586 | 1.459 | 0.99747 |
| 4 | 1.4398 | 1.4365 | 0.99772 |
| 3 | 1.5675 | 1.5646 | 0.99814 |
| 2 | 1.6946 | 1.6916 | 0.99821 |
| 1 | 1.7029 | 1.7006 | 0.99864 |
| 0.5 | $8.2748 \times 10^{-1}$ | $8.2334 \times 10^{-1}$ | 0.99499 |
| 0.4 | $5.7336 \times 10^{-1}$ | $5.6939 \times 10^{-1}$ | 0.99307 |
| 0.3 | $3.0259 \times 10^{-1}$ | $2.9990 \times 10^{-1}$ | 0.99111 |
| 0.2 | $9.4844 \times 10^{-2}$ | $9.3476 \times 10^{-2}$ | 0.98557 |
| 0.1 | $9.7215 \times 10^{-3}$ | $9.1463 \times 10^{-3}$ | 0.94084 |
| 0.09 | $7.0249 \times 10^{-3}$ | $6.5131 \times 10^{-3}$ | 0.92715 |
| 0.08 | $4.9227 \times 10^{-3}$ | $4.4725 \times 10^{-3}$ | 0.90854 |
| 0.07 | $3.3233 \times 10^{-3}$ | $2.9330 \times 10^{-3}$ | 0.88256 |
| 0.06 | $2.1424 \times 10^{-3}$ | $1.8107 \times 10^{-3}$ | 0.84514 |

TABLE 3-continued

Averaged efficiencies and single scattering albodo of alumina fibers: (a) $T_m = 1000°$ C.; (b) $T_m = 1500°$ C.

| D (μm) | $\overline{Q}_e$ | $\overline{Q}_s$ | $\omega$ |
|---|---|---|---|
| 0.05 | $1.3035 \times 10^{-3}$ | $1.0290 \times 10^{-3}$ | 0.78941 |
| 0.04 | $7.3666 \times 10^{-4}$ | $5.1839 \times 10^{-4}$ | 0.70373 |
| 0.03 | $3.7653 \times 10^{-4}$ | $2.1568 \times 10^{-4}$ | 0.57281 |
| 0.02 | $1.6992 \times 10^{-4}$ | $6.3201 \times 10^{-5}$ | 0.37194 |
| 0.01 | $5.9670 \times 10^{-5}$ | $7.8375 \times 10^{-6}$ | 0.13135 |
| 0.005 | $2.7939 \times 10^{-5}$ | $9.7769 \times 10^{-7}$ | 0.03499 |

Since $\omega$ is just the ratio of $\overline{Q}_s$ to $\overline{Q}_e$, it follows closely the trend displayed by the averaged efficiencies.

To illustrate the effect fiber size has on the radiant output, calculations were performed for decreasing fiber size for three different cases: Case (1) $\phi$ is kept constant; Case (2) the surface area available for convective heat transfer between the gas and solid phases, i.e. $(1-\phi)a$, is kept constant; and Case (3) both $(1-\phi)a$ and $\tau$ are kept fixed. In real situations, all three cases involved increasing the number density of the fibers appropriately. In addition, Case (3) requires increasing the physical thickness of the porous layer.

The input parameters needed to calculate radiant output are shown in Table 4, infra. The parameters in Table 4a are those that are kept constant for all the calculations. Their values are chosen to be representative of PRB and have been previously used (See: Tong and Sathe, supra). Notice that the flame is assumed to be 0.1 cm thick and is situated in the middle of the porous layer $[(\xi_1+\xi_2)/2=0.5]$. Table 4b lists the parameters that are varied, and the values indicated are used to establish the baseline results that will serve as the datum for comparison with the results for smaller diameters.

When D is changed, the parameters affected are $\tau$, $\omega$, and $P_2$ for Case (1), $\phi$, $\tau$, $\omega$, and $P_2$ for Case (2), and $\phi$, $x_3$, $\omega$, and $P_2$ for Case (3). It follows from equation (5) that the relationship among $\tau$, $x_3$, and D is

TABLE 4

Input parameters for heat transfer calculations (a) Parameters that are held constant
values used for the present study

| | |
|---|---|
| $x_i$ (m) | 1 |
| $x_3$ (cm) | 1 |
| $X_2 - X_1$ (cm) | 0.1 |
| $(\xi_1 + \xi_2)/2$ | 0.5 |
| $P_1$ | 0.01 |
| $P_3$ | $2.5 \times 10^{-4}$ |
| $P_4$ | 0.02 |
| $P_5$ | 5 |
| $G_e$ | $2.98 \times 10^{-5}$ |

(b) Parameters that are varied
values used for the baseline calculation

| | silica fibers | alumina fibers |
|---|---|---|
| D (μm) | 5 | 5 |
| $\phi$ | 0.95 | 0.95 |
| $\tau$ | 193.6 | 204.9 |
| $\omega$ | 0.995 | 0.965 |
| $P_2$ | 795 | 795 |

$$\tau = \frac{4\overline{Q}_e(1-\phi)x_3}{D} \quad (13)$$

Thus, when a new D is considered, the corresponding $\overline{Q}_e$ from Tables 2 or 3 is used in equation (13) to determine $\tau$. Additionally for Case 3, $x_3$ is adjusted according to the equation to maintain $\tau$ constant. Realizing a is equal to 4/D and utilizing the definition of $P_2$ (see Table 1), one can determine $P_2$ through $$P_2 = \frac{P_{2b}D_b}{D} \quad (14)$$

Where subscript b represents values used for the baseline calculation, i.e. values in Table 4b. For $(1-\phi)a$ to remain the same as that for the baseline calculation, $\phi$ must be related to D according to $$\frac{1-\phi}{1-\phi_b} = \frac{D}{D_b} \quad (15)$$

Equation (15) provides the relation for calculating $\phi$ for Case 2 and Case 3.

Figure 4A:
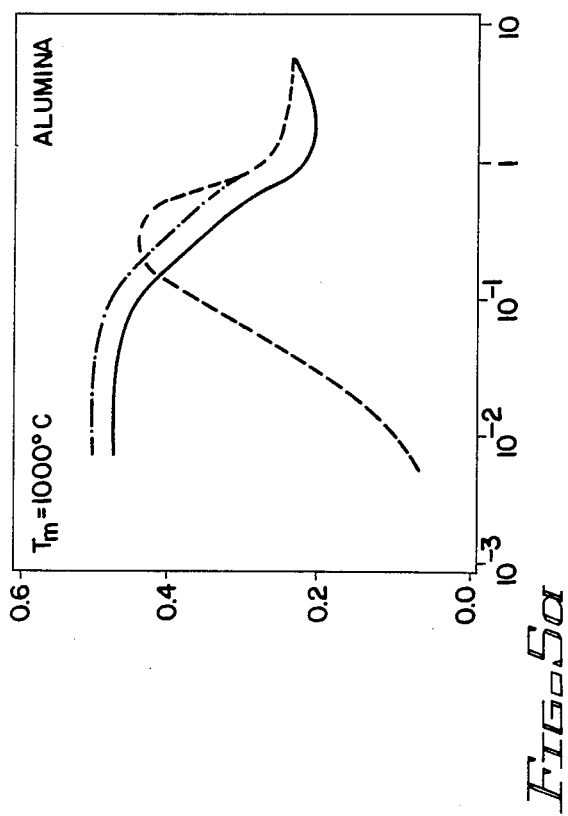
FIG. 4 is graphic representation of radiant output for varied diameter silica fibers at (a) $T_m = 1000°$ C.; and (b) $T_m = 1500°$ C.
Figure 5A:
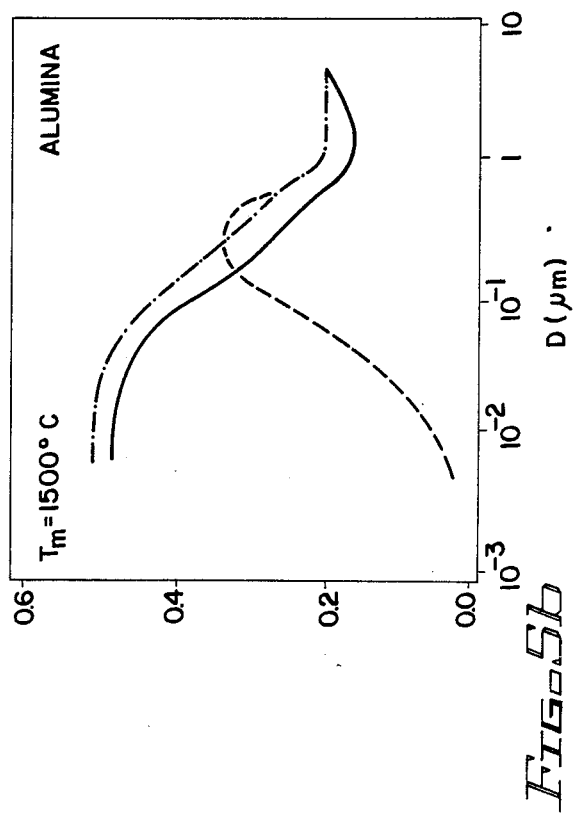
FIG. 5 is graphic representation of radiant output for varied diameter alumina fibers at (a) $T_m = 1000°$ C. and (b) $T_m = 1500°$ C.
Figure 4B:
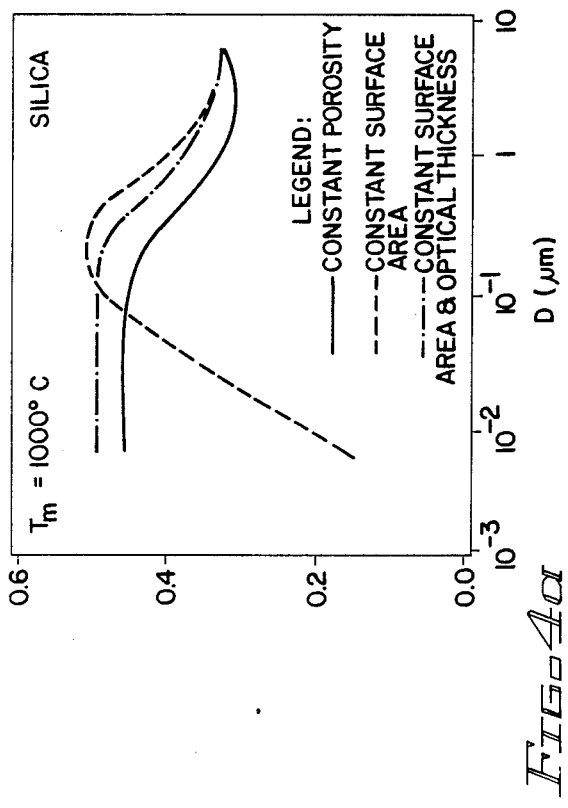
Figure 5B:
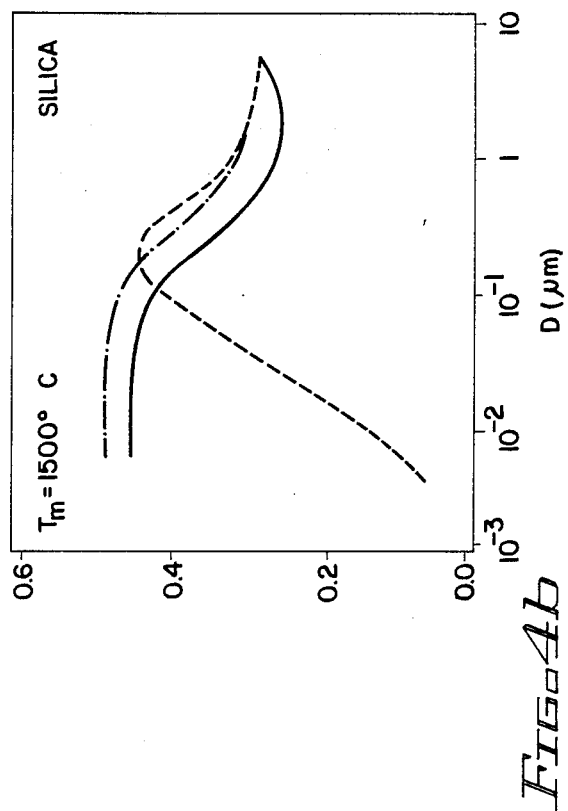

Depicted in FIGS. 4 and 5 is radiant output for the silica and alumina fibers, respectively. It is presented in a form that the values as read from the graphs correspond to the fraction of the thermal energy generated by combustion. The results for both types of fibers exhibit similar trends. This is not surprising since $\overline{Q}_e$ and $\omega$ for both the fibers exhibit similar behavior as D is decreased. For all three cases the radiant output initially increases slowly or even decreases slightly as D is reduced. This is a result of the oscillatory nature of the efficiencies as discussed earlier. The output increases substantially as D is further reduced. However, it reaches a plateau for Case 1 and Case 3 while that for Case 2 drops after reaching a maximum. The plateau occurs when $\omega$ is so small that it is no longer an influencing factor and further reduction in fiber size has no impact on the output. This suggests that one only needs to reduce the fiber size to the point where the plateau begins to occur. The drop for Case 2 can be explained by the following consideration. Equation (13) indicates that $\tau$ is directly proportional to $\overline{Q}_e(1-\phi)$ and inversely proportional to 1/D. As D is reduced beyond the maximum point, both $\overline{Q}_e$ and $(1-\phi)$ decrease and their product decreases at a faster rate than 1/D increases. Hence, one ends up with smaller $\tau$ for decreasing D. As demonstrated by Tong and Sathe (1988), smaller $\tau$ results in lower radiant output.

It is quite apparent that there is definite advantage to using fibers that are smaller than order of 1 $\mu$m in diameter. Based on the plateau values for Case 1 and Case 3 and the maximum output for Case 2, the radiant output when compared to the baseline value increases by 42, 54, and 63 percent, respectively, for silica fibers at $T_m 1000°$ C. The corresponding increases are 61, 72 and 57 percent for $T_m = 1500°$ C. A similar comparison shows 100, 109, and 89 percent increases, respectively, for alumina fibers at $T_m = 1000°$ C. and 140, 150 and 72 percent increases, respectively at $T_m = 500°$ C.

From the foregoing, it is further apparent that the use of fibers smaller than order of 1 $\mu$m in diameter will improve the performance of PRB. Based on a one-dimensional conduction, convection, and radiation heat transfer model with spatially dependent heat generation, radiant output for different fiber sizes was computed. The electromagnetic wave scattering theory was used to calculate the radiative properties which were then used as input parameters in the heat transfer model. Both silica and alumina fibers have been analyzed although the present invention need not be so limited. Thus, zirconia, silicon carbide and like ceramics having a complex refractive index comparable to silica and alumina will work herewith.

It was found that smaller fiber diameters resulted in smaller single scattering albedo and higher radiant output. For both types of fibers, significant increase in radiant output was found possible by reducing the fiber size. For a characteristic temperature of 1000° C. increases as large as 63 and 109 percent were obtained for the silica and alumina fibers, respectively. The corresponding increases at a characteristic temperature of 1500° C. were 72 and 150 percent, respectively.

From the foregoing, it is readily apparent that all of the aforestated objectives have been fulfilled by the present invention in a remarkable unexpected fashion. It is of course understood that such modifications, alterations and adaptions as may readily occur to the skilled artisan when confronted with this disclosure are intended within the spirit of the present invention which is limited solely by the scope of the claims appended hereto.

Accordingly, what is claimed is:

1. A porous radiant burner comprising a mold consisting of bound predried heat-cured sub-micron diameter ceramic fibers.

2. A burner according to claim 1 in which said mold contains a binder selected from the group consisting of alumina cement, zirconia cement and zirconia rigidizer in a binder-to fiber weight ratio of from about 0.2 to about 0.8.

3. A burner according to claim 1 in which said ceramic fibers are selected from the group consisting of alumina and silica.

4. A burner according to claim 2 in which said ceramic fibers are selected from the group consisting of alumina and silica.

* * * * *

UNITED STATES PATENT AND TRADEMARK OFFICE
CERTIFICATE OF CORRECTION

PATENT NO. : 4,977,111

DATED : December 11, 1990

INVENTOR(S) : Timothy W. Tong et al

It is certified that error appears in the above-identified patent and that said Letters Patent is hereby corrected as shown below:

Column 1, line 4:

Insert a second paragraph in the section entitled "INTRODUCTION":

---This invention was made with Government support under contract No. DE-FG02-87-ER13697 awarded by the Department of Energy. The Government has certain rights in the invention.---.

Signed and Sealed this

Sixteenth Day of March, 1993

Attest:

STEPHEN G. KUNIN

Attesting Officer

Acting Commissioner of Patents and Trademarks